(12) United States Patent
Keiser (10) Patent No.: US 7,448,410 B2
(45) Date of Patent: Nov. 11, 2008

(54) HIGH DIFFERENTIAL PRESSURE, LOW TORQUE PRECISION TEMPERATURE CONTROL VALVE

(75) Inventor: David Burton Keiser, Westminster, CA (US)

(73) Assignee: Griswold Controls Inc, Irvine, CA (US)

( * ) Notice: Subject to any disclaimer, the term of this patent is extended or adjusted under 35 U.S.C. 154(b) by 0 days.

(21) Appl. No.: 11/962,897

(22) Filed: Dec. 21, 2007

(65) Prior Publication Data

US 2008/0092966 A1    Apr. 24, 2008

Related U.S. Application Data

(62) Division of application No. 11/277,359, filed on Mar. 24, 2006, now Pat. No. 7,347,408.

(51) Int. Cl.
*F16K 5/20* (2006.01)
(52) U.S. Cl. .................. 137/625.47; 251/171
(58) Field of Classification Search ............ 137/625.47; 251/171, 315.08, 315.13
See application file for complete search history.

(56) References Cited

U.S. PATENT DOCUMENTS

| 4,026,516 A | 5/1977 | Matousek |
| 4,292,989 A | 10/1981 | Cazzaniga et al. |
| 4,744,572 A | 5/1988 | Sahba et al. |
| 4,822,000 A | 4/1989 | Bramblet |

(Continued)

OTHER PUBLICATIONS

Guideline for Application of Control Valves, Process Industry Practices, Jan. 2005 Revision, University of Texas at Austin, Austin Texas.

*Primary Examiner*—John Fox
(74) *Attorney, Agent, or Firm*—Law Office of Ken Dallara; Ken Dallara (57) ABSTRACT

A high differential pressure, low torque precision temperature control valve is disclosed herein. This valve is trunnionated with stem components that are separable from the plug for ease of maintenance and manufacturability and thus reducing the need to remove the entire plug and sealing assemblies in the field. Field repair of stem sealing devices can be accomplished inline. The stem design can be smaller in diameter with smaller bearing surfaces than would be anticipated creating a lower requirement of torque to rotationally transposition the plug within the fluid chamber while under high pressure. This valve's lower trunnionated stem is stationery reducing the problems associated with o-ring failure and leakage problems with objects that rotate. Due to the design of the orifices in the plug, this valve is capable of repeatability at lower opening ranges than prior art valves and reduces jetting, caviation and erosion often associated with lower opening ranges. Sealing devices are tensioned onto the plug through the use of non-metallic o-rings reducing wear and friction issues thereby further reducing the torque requirement to adjust the valve. This valve is created in a bypass configuration, and as such, the plug orifices have been modified to efficiently reduce pump loads in the full bypass condition. The throughports of the plug in this valve are designed such as to create an equal percentage characteristic that does not exceed prescribed linear flow characteristics and provides a relatively constant total combined $C_v$ over the travel range of the plug. It is preferable that this valve is made from cast iron components, but other materials who have similar stabilities over the pressure ranges and fluid characteristics introduced are acceptable.

10 Claims, 7 Drawing Sheets

U.S. PATENT DOCUMENTS

| | | |
|---|---|---|
| 5,338,003 A | 8/1994 | Beson |
| 5,494,256 A | 2/1996 | Beson |
| 5,542,645 A | 8/1996 | Beson |
| 5,624,101 A | 4/1997 | Beson |
| 5,937,890 A | 8/1999 | Marandi |
| 6,948,699 B1 | 9/2005 | Keiser |

HIGH DIFFERENTIAL PRESSURE, LOW TORQUE PRECISION TEMPERATURE CONTROL VALVE

RELATED APPLICATIONS

This application is a divisional application from the originally filed application Ser. No. 11/277,359 and herein incorporates the aforementioned application and also claims prior of provisional application No. 60/767,152 entitled "High Differential Pressure, Low Torque Precision Temperature Control Valve" filed on Mar. 7, 2006 in the name of David B Keiser, said provisional application being hereby incorporated by reference as if fully set forth herein.

FIELD OF THE INVENTION

The specific field of the present invention relates to valves used to control the temperature of specific areas in buildings through the regulation of flow of chilled or heated fluids through air handling devices. Due to this inventions characteristics, it has applications throughout many fields where precision control of fluid flow is desired.

BACKGROUND OF THE INVENTION

The background of this invention delves into the arena of valves used to control the flow of fluids, especially water. Water being a unique fluid due to it's noncompressability and it's ability to be present in 2 forms at room temperature (liquid and vapor). Emphasis has been placed on using valves in piping structures as a means for isolating or shutting off flow to particular areas. Heating and cooling within climate zones have been controlled by starting and stopping fluid control into piping structures, with the associated pumps often cycling with the valves. With the costs of energy rising, current emphasis is on using valves to act as precision temperature controllers, regulating the flow of chilled or heated water into and out of piping structures, reducing the load on the pumps and heating and cooling units thereby decreasing energy demands, while maintaining properly controlled climate zones. Therefore, the type of valve necessary for this application needs to possess unique characteristics.

There are basically two types of valves used in the application of water handling; those using a vertical displacement of the sealing mechanism and those using a horizontal or rotational displacement of the sealing mechanism.

Vertically displaced valve include globe and gate valves, where the sealing member either plunges into a slot or where a plug is compressed onto a seat. Both devices have similar operating characteristics and also have similar problems. The sliding stem of the valve moves vertical through sealing o-rings and packing glands. The sliding stem movement tends to drag along creating leaks thereby shortening the life of the sealing system. In order to prevent this leakage, more sealing and packing glands are used overly constraining the stem movement effecting the controllability of the valve. Due to friction damage, these o-rings and packing glands require frequent maintenance and replacements. O-rings are best used for rotational sealing application and are often used as wipers to prevent contamination, but often roll up and cease when subjected to vertical motion, especially when subjected to a large pressure difference between the sealing surfaces of the O-Ring. High pressure is also to the cause of valve stem blowout, as there is little to protect the valve stem from acting in the normal vertical manner, only escaping the parameters of the valve stem run. As there are many turns necessary to move the valve between it's open and closed positions, more control can be exhibited, but these many turns also lead to hysteresis and deadband as there is a range through which an input signal can be varied, upon reversal of direction, without initiating an observable change in the output signal. This sensitivity or mean static gain is compounded by hysteresis of the valve causing inaccuracy of the control of the valve, especially in the presence of high pressure which causes the sealing member to be more difficult to position. At higher pressures striction can also occur. Striction is a combination of stick and friction, where a force large enough to overcome the striction of the valve at high pressure is too great to create a small amount of change. Striction along with the hysterisis can cause a controller to cycle many times trying to achieve the proper setting. Vertically displaced valves are also difficult to control in multiple port configurations. It is almost impossible for both plugs to seat simultaneously or open to exactly the same location with one controller for 2 or more ports. Studies have shown that there can be up to a 20% overflow at 60-70% of opening between the ports, causing increased energy costs for pumping.

One of the most damaging forces that can destroy valves and the downstream piping associated with the piping system is cavitation. Cavitation is the noisy formation and subsequent collapse of water vapor formed when the pressure of a liquid drops below its vapor pressure at the vena contracta and then recovers to a pressure level above it's vapor pressure downstream of the valve. The vena contracta is the constriction part of the valve when the valve is throttled at the lower ranges of openness. The fluid on the open side of the valve attempts to "jet" past the opening of the valve in a minimal degree of openness. This is especially prevalent in vertically displaced valves as there is a longer amount of time needed to open the valve including a longer time period where cavitation can take place. This cavitation in high pressure systems can destroy the sealing member of the valve and also causes high pressure jets of fluid to directly impinge on downstream valves and piping system.

Horizontally displaced or plug valves are possibly the oldest type of valve is use today, dating back to the ancient ruins of the early Roman water systems. The plug valve has a rotating plug, through which a passageway is defined allowing fluids to flow when the passageway is unobstructed by the walls defining the valve seat. The two main designs in use today in the high pressure applications are segmented eccentric and through hole plug valves. Segmented refers to the fact that a segment or section of the plug is removed characterizing the flow. Eccentric refers to the fact that the axis of rotation is not along the axis of the flow of the fluid, causing a leverage force upon the closing of the valve along with allowing the segment to swing clear of the walls of the valve during opening and closing reducing friction, minimalizing wear. Unfortunately, due to it's eccentric characteristic, the presence of high pressure increases the amount of force needed to open the valve, and due to it's segmented design, a high degree of caviation is present when the valve is throttled close to the closed position. This jet of fluid can actually be more harmful than with vertically displaced valves as the shape of the segment can form a lethal jet of high pressure water past the valve without any obstacles in the valve itself. The pressure difference between the high and low side of the valve in this throttled position may also suck the plug into the seat. The high pressure can also cause the segmented portion to pop out of the seat, causing a jump in the flow. Eccentric plugs are not suitable for multiple outlet port configurations as the eccentric positioning for one opening will not be suitable for other openings at the same time, making complete shutoff impossible to obtain.

The other plug valve is a through hole or ball valve. The installed flow characteristics of a normal ball valve exhibits a non-linear equal percentage relationship of how the flow in the system changes relative to changes in the valve opening. Ball valves are generally referred to as quarter turn valves as they only require one quarter of a turn to facilitate a fully open state to a fully closed state. Typical ball valves act as quick opening valves where 15% of opening of the valve can equal roughly 50% of the flow. This large amount of fluid passing through such as small opening causes jetting of the fluid and higher heat transfer through the coil, resulting in higher energy consumption. Caviation, that results due to the jetting also has a higher potential to damage than would be found in globe or gate valves. It is very difficult to control below 30% of opening as the amount of fluid flow is not directly relational to the percentage of the opening of the valve. Normal ball valves optimally work between 30 to 70% of the opening percentage and exhibit sluggish behavior beyond 70% opening. Some manufactures have designed inserts for the throughhole portion of the plug, such as Series CPT Characterized Seat Control Valves manufactured by Worcester Controls. Unfortunately, high pressures will cause these inserts to break or blow out under the pressures as their construction is less sturdy under the pressure than the surrounding plug material.

High pressures also cause high degrees of torque to open the valve. This is due to the fact that the plug or ball floats in the valve body as it is only suspended by an upper stem. In high pressures, the ball is forced upon the o-rings that prevent leakage of the valve. These high thrust loads on the o-rings cause o-ring wear due to the friction of the ball against the o-ring during the turning of the ball under pressure. This friction can also lead to deadband, as the amount of force necessary to start the movement of the ball can not be stopped fast enough for minor changes in flow. Some manufactures have created sealing systems where o-ring are pre-loaded in tension against the ball though a series of metal springs, so that the o-rings will always be in contact with the ball as disclosed in U.S. Pat. No. 4,292,989 issued to Cazzaniga et al on Oct. 6, 1981 and in U.S. Pat. Nos. 5,624,101, 5,542,645 and 5,494,256 issued to Benson.

Another problem with the current prior art of quick opening valves is the effects on the efficiencies of the coils or piping systems that the valves are intended to regulate. One application of the valve is to control the amount of fluid flowing into coils of heating and cooling systems. Current state of the art valve cause inefficient heat transfers by causing a large percentage of heat transfer or flow with only a minimal opening of the valve. This lack of fine control at the lower percentage of valve opening requires the continual cycling of heating and cooling systems, further exacerbating the wear and destruction of the sealing components of the valve.

In low flow, high pressure situations, the difference in pressures between the high side and the low side of the ball can create a venturi effect on the low side of the ball, sucking these extended o-rings out of position. Some manufactures have designed a trunnion apparatus to support the ball from the upper and lower extremes. This trunnion design increases the number of o-rings as the stems are incorporated into the actual ball and the entire unit moves. Repeated actuations of the valve will cause o-ring and packing gland wear as with the vertically displaced valves leading to leakage and maintenance issues. This creates problems as the entire ball and stems must be removed as one to replace the o-rings on the stems thereby causing re-assembly issues with the presence of the o-rings that surround the actual ball itself. The cost of casting and machining of these stem and valve apparatuses is very high and tolerances are very small.

As described, there are problems with the current state of the industry involving precision control of valves. Leakage through worn or displaced o-rings causes false reading in the control systems causing energy to be wasted in powering the pumps and in the actual piping system as well. These false reading cause fluxations in temperature causing discomfort to the users, along with the environmental concerns of corrosive or toxic fluids escaping through failing o-rings and valves. To combat leakage, more o-rings and packing glands are required which increases friction or striction. This friction requires more torque from the actuators and more power consumption, or operators are forced into larger more expensive actuators for the valves. Friction also causes more problems when combined with the naturally occurring deadband and hysteresis in valves. Poor flow characteristics causes erosion of the valve members through the effects of caviation, inaccurate control variables and non-linear equal percentage flow relationships. Compatability of low flow abilities of various valves prevent proper balancing and utilization of the piping system, that the valves were originally designed to control.

It would be advantageous to have a valve that would be able to withstand higher pressures while maintaining a low amount of torque required for it's operation, along with the inherent ability to operate at lower flow rates without the damaging effects of caviation and erosion. It would be advantageous to have this valve be maintainable without large scale disassembly, whilst the sealing member is restrained from movement. It would be advantageous to have a investment casted trunnionated spherically shaped plug valve with separable stems in a modular design decreasing assembly and manufacturing time, as a hollow ball can be subjected to minimal machining and preparation reducing fatigue and induced stresses on the actual ball. It would be advantageous to have integral with the plug equally shaped parabolic openings symmetrical about the directrix of the parabola, said openings being diametrically opposed juxtapositioned along the other side of the plug, whereby the smaller orifice or vertex of one opening is opposite the larger or apex orifice of the other opening. It would be advantageous to have a third such opening or more along the surface of the ball, to facilitate a greater number of ports for the valve. It would also be advantageous to have floating sealing members that are restricted in their movement, restrained into a specific space that will be not be effected by the presence of a high differential pressures on either side of the plug. It would be advantageous to have this trunnionated plug which is integrally enhanced with parabolically shaped flow paths, which is sealed with restrained floating o-rings to be placed within a valve housing where low amount of torque is required to precisely control temperature through the control of flow of fluids throughout piping systems.

It is an object of this invention to create a plug valve that is trunnionated with separable stem components.

It is an object of this invention to provide a plug valve with stems of smaller diameter that will require smaller bearing surfaces creating less friction.

It is an object of this invention to provide a plug valve with a stationery lower stem to reduce o-ring wear and associated leakage issues.

It is an object of this invention to provide a plug valve that does not produce high velocity jets of fluids when valve is opened a small percentage, whereby the jets of fluid cause venturi effects that can dislodge o-rings from their seats, damage piping system from caviation and erosion to the ball valve components.

It is an object of this invention to provide a plug valve that has the capacity of up to 3000 Gallons per Minute and pressure differentials up to 100 psi but yet has the torque requirements of much smaller valves with minimal amounts of hysteresis.

It is an object of this invention to provide a plug valve with 2 or more ports where bypass ports are restricted in size to limit flow to 80% of the straight through flow path.

It is an object of this invention to provide a plug valve which is a mixing or diverting valve that when operating in a partial bypass mode, the total combined flow from bypass and straight through paths are constant, allowing for a reduction in pump energy usage.

It is an object of this invention to provide a plug valve whereby disassembly, repair and cleaning in the field of usage is accomplished with minimal effort where ball stems, stem seals and packing glands can be replaced without effecting the ball/o-ring interface.

It is an object of this invention to provide a plug valve whereby o-rings contain non-metallic components thereby reducing the possibility of corrosion, decomposition and failure.

It is an object of this invention to provide a plug valve whose inherent flow characteristics dictates that the $C_v$ changes in an equal percentage manner over the travel range of the valve.

It is an object of this invention to provide a plug valve with equal percentage characteristics of flow and travel that does not exceed that which would be expected in a true linear relationship contrary to the quick-opening prior art valves that open more quickly than would be preferred in a linear equal percentage relationship.

It is an object of this invention to provide a plug valve that by retarding flow at lesser percentages of the travel range of the valve, thereby increases the efficiencies of the piping systems by creating a more linear relationship between valve opening percentage and percentage of heat transfer.

We meet these objectives with an approach as disclosed in the following detail description of the invention.

DETAILED DESCRIPTION OF INVENTION THROUGH DRAWINGS

The present invention will be detailed in relation to the aforementioned drawings. All disclosure is representative of the best mode of practicing this invention but that it is assumed that those skilled in the art will be able to practice this invention in other fields of application, nor does this disclosure limit the construction of this invention to the parts herein disclosed. Applicant recognizes that development of future inventions may lead to better parts than those disclosed, but the intent of this application is to show the best available parts currently available by their fit, form and function to their exclusive use by this application.

Figure 1:
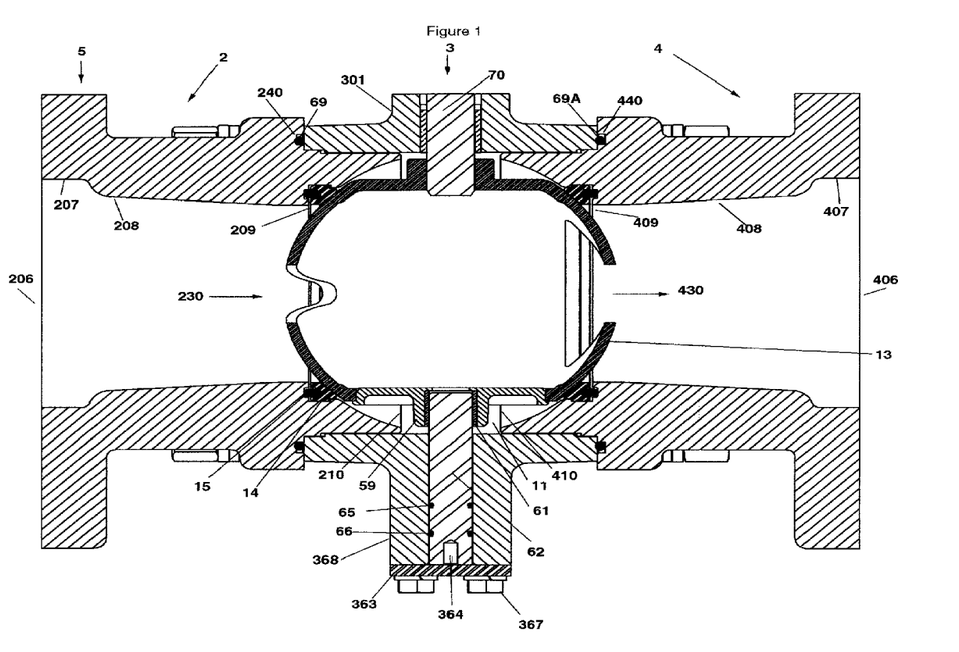
In FIG. 1, a cross sectional view of a 3 port valve is shown with the ball in the open position where the third port is facing the viewer and is thusly not seen.
Figure 2:
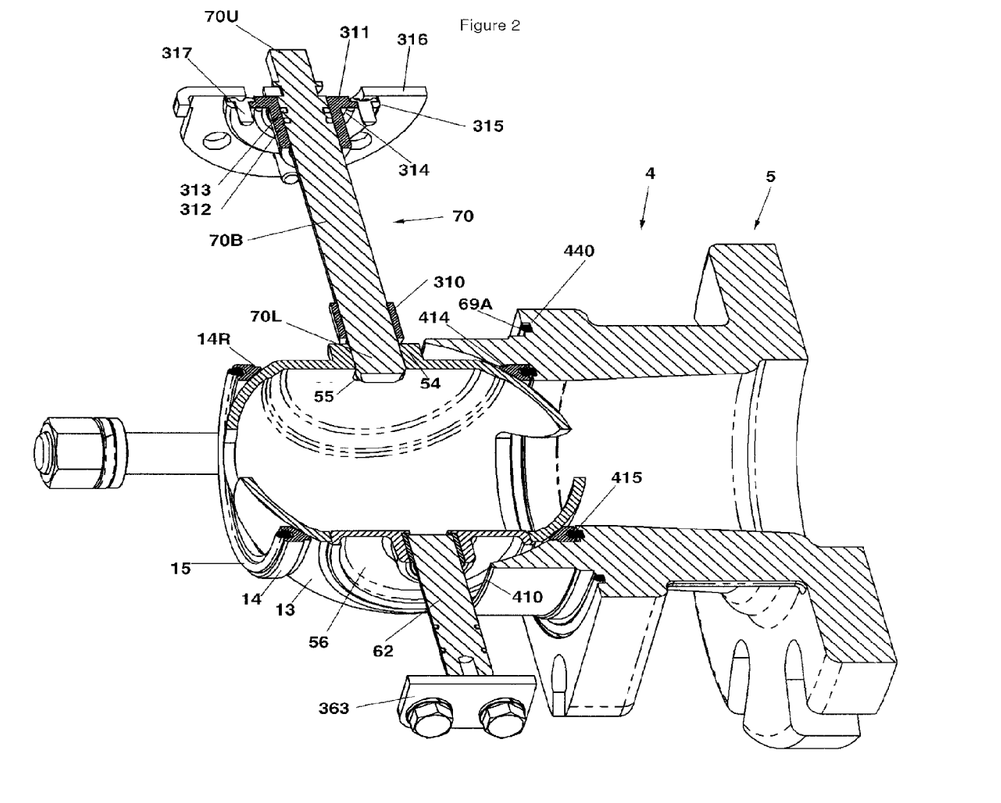
In FIG. 2, the inlet and body portion of the housing is removed to show the ball and stem arrangement.
Figure 3:
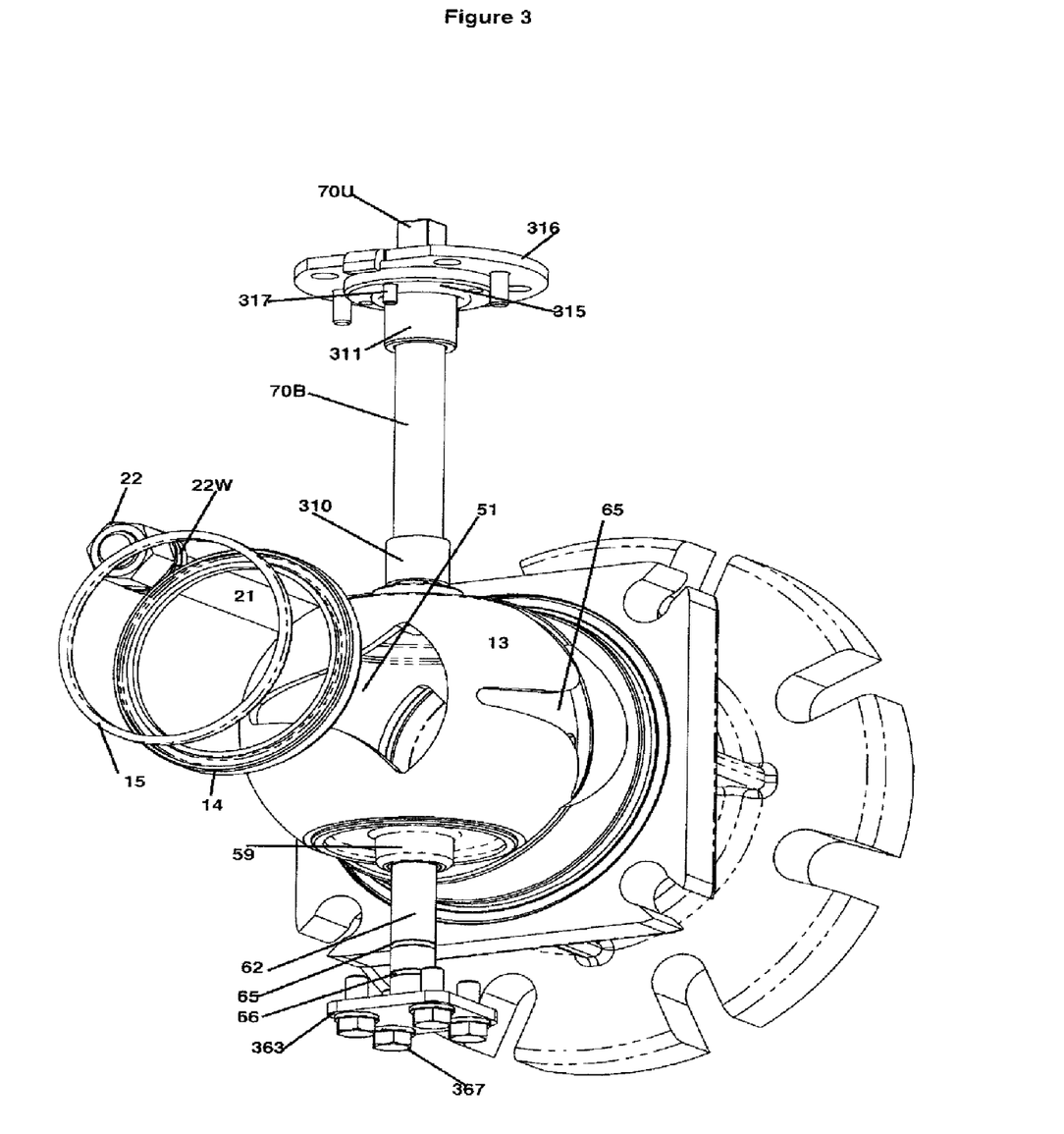
In FIG. 3, the inlet and body portion of the housing is removed and the sealing means is exploded out in this 3 port ball valve.

In the principal embodiment of this invention, FIG. 1 shows a cross-section of a valve that is atypical of the ones used in the aforementioned applications. The valve 1, consists of three main sections, inlet 2, valve body 3, and outlet 4. Inlet 2 and outlet 4 in this view are representative of the style of attachment means used in this type of valve. Generally this type of valve is used in commercial or industrial application where iron pipe is present. Flange 5 is shown is one method of accomplishing the attachment means for this valve 1. Other methods can include welded, socketed, threaded, brazed and soldered attachment means are not shown here. This valve is not limited to a specific attachment means on the inlet nor on the outlet side of this valve 1 nor does the inlet and outlet portion need to have the same attachment means. Valve body 3 functions with various attachment means and it's construction shall be appropriate to the pressures and flow requirements of the system. Outlet 4 in this figure is shown as a singular outlet, but this does not limit this invention to a single outlet. Multiple outlet configurations are desired for this valve.

Valve body 3 is positioned between the outlet 4 and inlet 2 along the same central axis. Inlet 2 and outlet 4 are fastened together interfacing valve body 3 between inlet 2 and outlet 4 using multiple threaded shafts 21 terminated with threaded nuts 22 and locking washers 22W on each end of shaft 21 through fastening plates 23 and 24. Inlet 2 has exterior opening 206 which defines the initial inlet bore 207 which tapers down to entrance bore 208 and terminates at entrance 209. Entrance 209 defines the passageway 230 for the fluid as it enters or is shut off from entering the plug. In this invention, the plug is a spherical ball 13. Exit 409 likewise defines the passageway 430 for fluid that exits the valve through ball 13. Interior face 210 of inlet 2 defines one edge of chamber 11. Chamber 11 is defined by face 210, valve body 3, and face 410. Slope 212 and slope 412 are defined by the diameter of ball 13 and is positioned such as not to interfere with the rotation of ball 13. Interior of face 210 lies slope 212 which terminates on landing 213 which is the upper portion of flange 214. In accordance with the teachings of U.S. Pat. No. 6,948,699 issued to Keiser, flange 214 is to contain the axial displacement of sealing member 14 along raceway 215 to prevent disengagement with ball 13 due to hydrodymanic forces present when ball 13 is opened a small percentage of travel and high fluid pressure on the inlet side causes the sealing member to be pulled to the low pressure side of the valve. Flange 214 also aids in the assembly of valve 1 as it allows a preload of tension from linear stroke o-ring 15 while maintaining it's position within raceway 215. Keiser also taught the use of linear stroke o-ring 15 as it uses a conventional double D style of o-ring which is elliptical in shape. Use of conventional o-rings eliminates the need for expensive metal springs and also eliminates the need for extra o-rings to protect the metal springs from corroding. Linear stroke o-ring 15 also serves as a seal preventing fluid from being present under sealing member 14 eliminating leakage. The composition of sealing member 14 is polymer material, preferably polytetraflouroethylene, whose wear characteristics include self-lubricity, toughness and chemical compatibility with fluids present.

Figure 4:
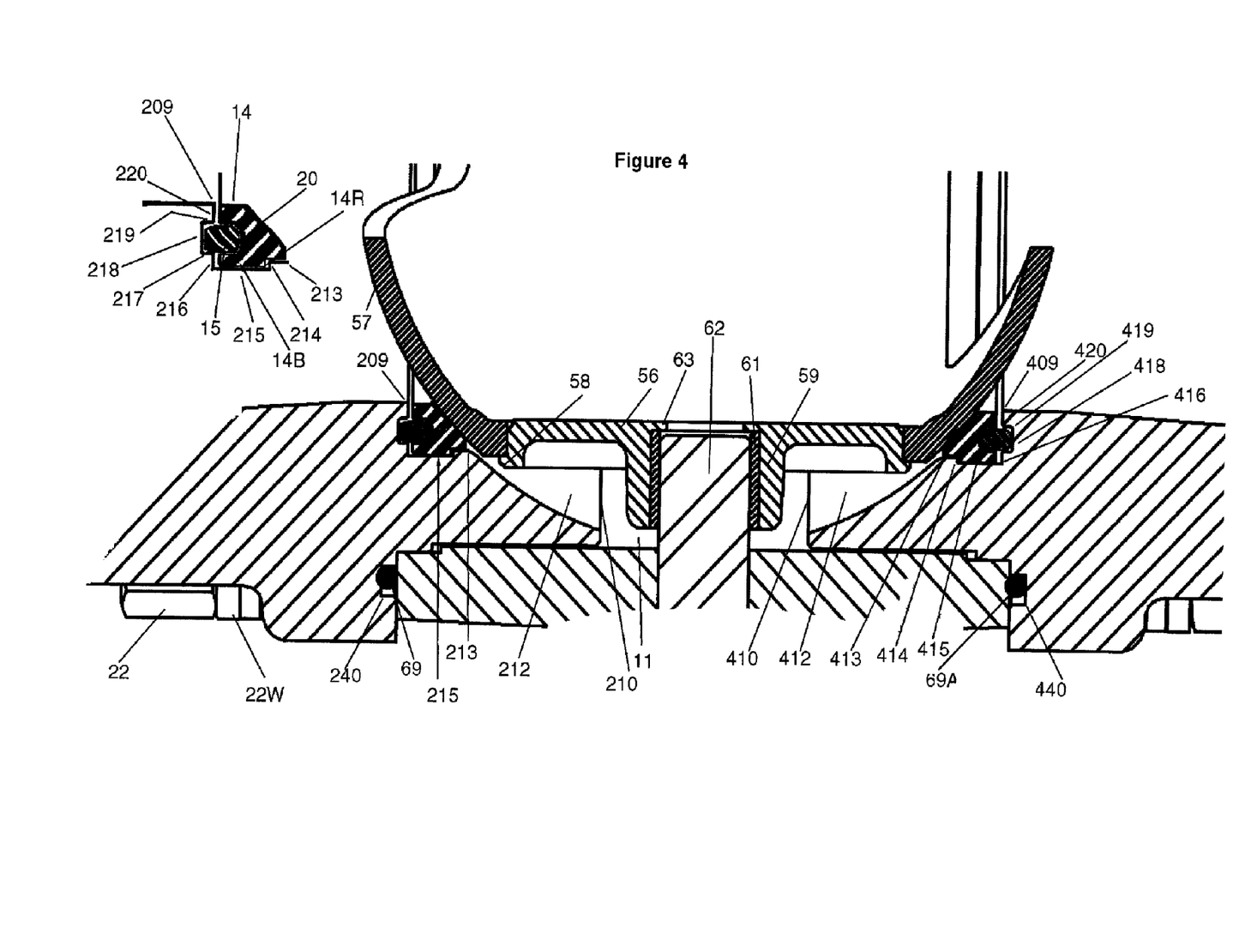
In FIG. 4, the detail of the lower portion of the ball and lower stem are shown where raceway is detailed.
Figure 5:
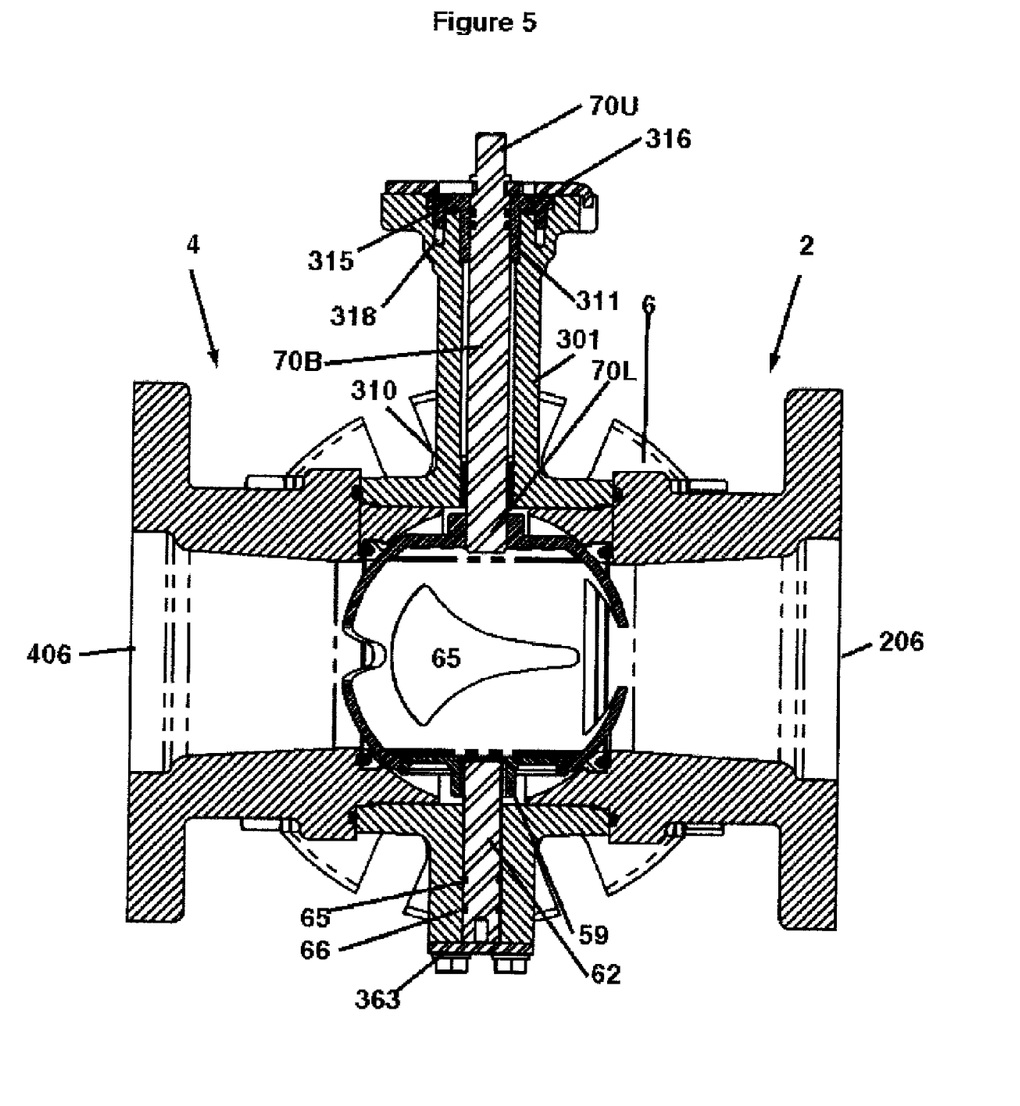
In FIG. 5, a cross sectional view of the 3 port valve is shown in the fully opening position.

FIG. 4 details the dynamics of the interface between sealing member 14, linear stroke o-ring 15 and raceway 215. Sealing member 14 has a curved surface 20, mating specifically with the outer diameter of ball 13, and is in constant contact with ball 13. Linear stroke o-ring 15 is preloaded under pressure into it's containment barriers. This preloaded tension in compression forces sealing member 14 onto positive contact with ball 13. Sealing member 14 has a lower portion 14B, opposite curved surface 20, which is shaped to travel along raceway 215 with a relief 14R cutout to accommodate termination at flange 214. Curved surface 20 is the only sealing surface along ball 13. Linear stroke o-ring 15 is encased in groove 118, defined by the lower shelf 217 and upper shelf 219 whose leading edge is beveled to facilitate the assembly of the o-ring 15 into groove 218. Anterior Stop 220 defines the rearward termination of the travel of sealing member 14 along raceway 215. Linear stroke o-ring 15 is composed of materials suitable for chemical compatibility, ductility and repeated compressibility. In this invention, a synthetic compound of rubber is used. In this invention, groove 218 is perpendicular to face 210, but this invention can be accomplished by transposing groove 218 and flange 214 to opposite sides of the raceway from their location in FIG. 1 so that groove 218 is parallel with face 210. Outlet 4 has similar layout characteristics as inlet 2 in the location of sealing member 14 along raceway 415, flange 414, landing 413, stop 420 and linear stroke o-ring 15 within groove 418 defined by shelf 417 and 419.

Figure 7:
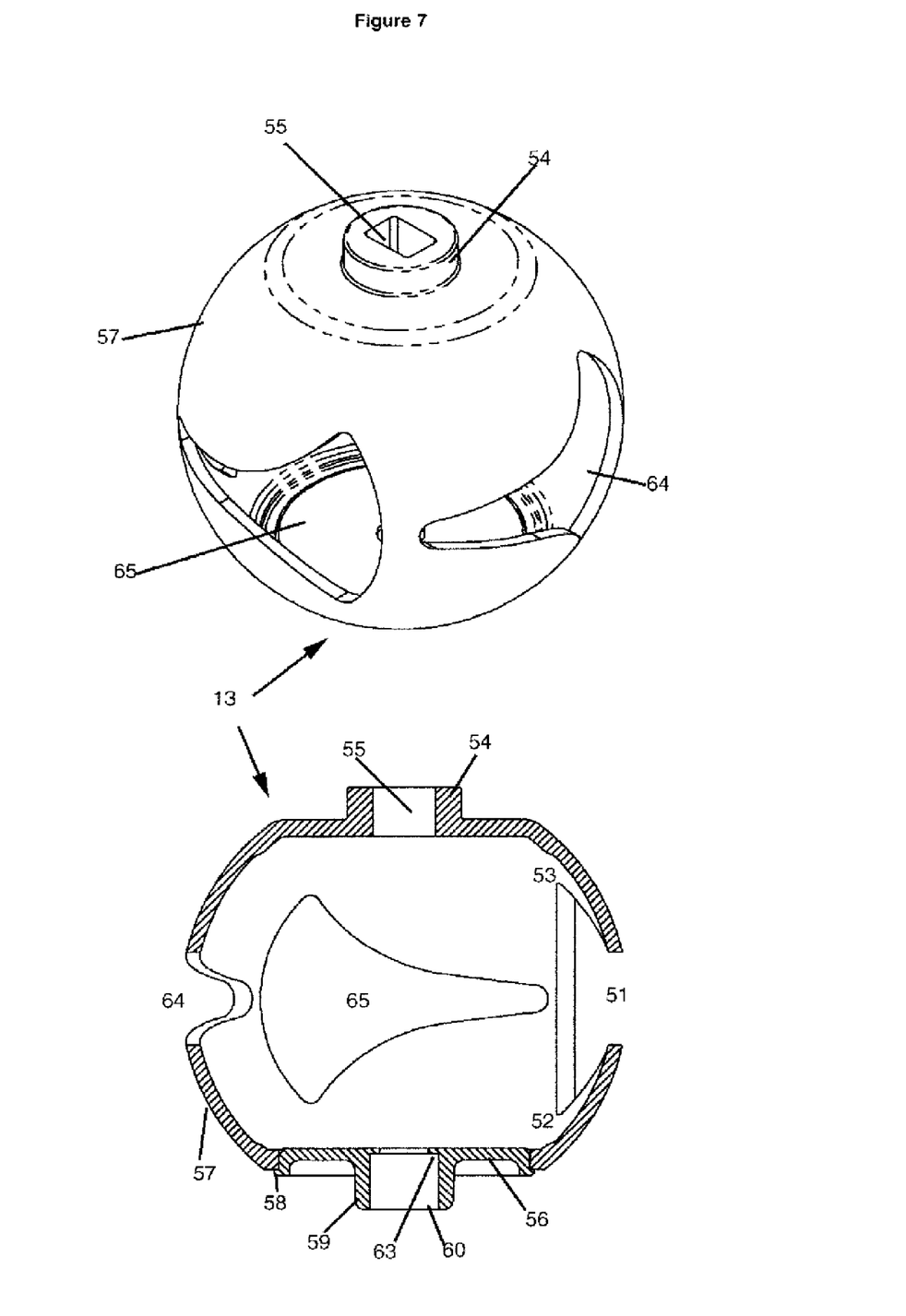
In FIG. 7, the ball is shown in cross-sectional and oblique views.

The best mode for creating ball 13 is investment casting, though other forms of fabrication can be accomplished. After casting, only minor machining is necessary to finish the ball for a smooth exterior surface. FIG. 7 details ball 13 as having a defined top containing slot bus 54, a bottom defined by opening 57 and a series of parabolic openings 51. Slot bus 54 contains slot 55 defined by the shape of the lower portion of upper stem 70L. It is generally accepted that a rectangular slot is prescribed as provides a larger surface area and takes advantage of the torsional stability of the stem material and increased surface area, though other shapes can be used such as Torx or hex. Slot 55 has corners finished to a tooling radius to facilitate an easier manufacturability and also to aid in the insertion of stem 70L into slot 55. Tolerances between stem 70L and slot 55 are directly proportional to the amount of deadband of the valve. Bottom of ball 13 is defined by an opening whose circumference 57 is large to facilitate the casting process, also interfaces with bottom stem interface 56. Bottom stem interface 56 is a separate piece cast of the material as ball 13 where lip 58 contacts the outer diameter of ball 13 securing it's fit and preventing stem interface 56 from entering the interior of ball 13. Bottom bus 59 protrudes from exterior surface of stem interface 56 and containing circular slot 60, inside of which bearing surface 61 is forcibly inserted to bearing stop 63. FIG. 1 details the interface between slot 60, bearing 61 and bottom stem 62. Bottom stem 62 is stationery requiring the bushing to be placed interiorly in slot 60. It is the modularity of this invention that makes it unique. The wear items are removeable and are separable from the ball itself. Stems can be withdrawn and o-rings are replaceable without interfering with the ball and the sealing members that are left in place. Major servicing of the valve can be done while the valve is inline, without the need for disassembling the valve for the majority of repairs. Parabolic opening 51 are in accordance with the teachings of U.S. Pat. No. 5,937,890 issued to Marandi, which has common-ownership with this application, which states that parabolic openings more accurately compensates for the arcuate or nonlinear path traveled by the parabolic opening 51 because the parabolic opening 51 provides a cross-section that projects across the passageway 230 and 430 to obstruct the passageway 230 and 430 in substantially equal percentage fashion as ball 13 is turned in a particular degree of rotation. The apexes of the parabola 52 and 53 that defines parabolic opening 51 is mathematically calculable based on the desired maximum flow of fluid exiting the valve. In this invention, parabolic opening 51 is laser cut directly into ball 13, as prior art inserts in the presence of high pressure can be either dislodged from their mountings on the ball or be shattered when in static interference with the fluid flow separate from the ball. It is also unique to this invention that throughflow ports are juxtapositionally opposite and diametrically opposed. Thus as ball 13 rotates into an opening position, the entrance parabolic opening 51 is at it's smallest aperture, where the exit parabolic opening 64 is at the maximum aperture. This diametric opposition reduces the jetting of fluids, while maintaining a relative constant $C_v$. Prior art valves rotates the smallest aperture on both the entrance and exit of their cylindrical throughports, causing a jetting of the fluids at high pressure. This arrangement of diametically opposed openings are juxtapositionally opposite of each other along similar axis and diameters. The vena contracta is minimalized thus reducing the chances of caviation as the pressure drop is minimalized and a higher recovery rate is realized. Valve surfaces are subjected to less erosion due to caviation and due to the parabolic shape, a smoother percentage relationship is found that stays at or below a true linear percentage relationship, allowing for greater precision and control of the fluid flow at 10-20% of opening, a critical area of non-operability for prior art ball valves.

The preferred embodiment is shown in FIG. 7, that shows ball 13 in a 3 port or bypass configuration. Though shown with a single bypass connection, this invention is not limited to a single bypass configuration. It is critical that the size of the parabolic opening 65 is such that it produces 80% of the $C_v$ of the parabolic openings of 51 and 64. Prior art ball valves in 3 port configurations do not account for the friction losses through the piping system and thus allow a disproportionate amount to bypass into the 3rd port when mixing. When the bypass port is fully open, accommodating a complete bypass or diversion from the piping system, there is an increased resistance to match the resistance of the adjacent piping structure in the straight-through flow path, thus eliminating the effort to balance the valve.

Bottom stem 62 enters through bottom stanchion 368 which is part of valve body 3. O-ring 69 is located in groove 240 which is part of the interior portion of inlet 2 provides sealing between valve body 3 and inlet 2. Groove 440 provides a similar groove for the interface between outlet 4 and valve body 3 whereby o-ring 69A is located therein. Exterior portion of bottom stem 62 is piloted into stem base 363 by pilot stem 364 preventing accidental dislodgement during assembly. Bottom stem primary o-ring 65 is located along the shaft of stem 62 and secondary o-ring 66 is located aft of primary 65 for additional protection against leakage. Base 363 is attached onto exterior portion of stanchion 368 using attachment means 367.

Upper stem 70 is the principal rotational means for transferring the location of ball 13 within chamber 11. Upper stem 70 is machined out of one piece of common circular rod stock into 3 distant areas, lower portion 70L, body portion 70B and upper portion 70U. In this invention, lower portion of stem 70L is machined to be rectangular prior to being inserted through slot 55. A stop may be incorporated into the design of ball 13 and slot 55 but optimal performance is achieved without the presence of a stop allowing for minimal ball travel in the vertical plane should the need exist without placing compressive forces onto stem 70 causing rupture of the stem. Upper stanchion 301 is located on the upper portion of valve body 3 and is integral therewith. Immediately adjacent to the exterior sides of valve body 3 is the inlet portion 2 on one side and outlet portion 4 on the other side. Groove 240 containing o-ring 69 provides sealing between the interface of valve body 3 to inlet 2 and groove 440 containing o-ring 69A provides the sealing interface between valve body 3 and outlet 4. Anterior end of stanchion 301 is immediately adjacent to post 54 of ball 13 and is separated from post 54 to prevent wear and friction. At the anterior end of stanchion 301, bearing surface 310 is located, being sufficiently long enough to support the thrust side loads experienced by ball 13 under the presence of high pressure but short enough to allow for minimal frictional forces. Upper stem body 70B is circular in nature has a length dependent upon the amount of torque to be generated by the actuator of the valve, using the laws of physics. At the exterior end of stanchion 301, bearing block 311 is located. Bearing Block 311 is long enough to encapsulate primary sealing gland 312 and secondary sealing gland 313. Exterior end of bearing block 311 is adapted to interface with anti-twist plate 315. O-ring 314 creates a seal between exterior end of bearing block 311 and exterior end of stanchion 301. Pinions 317 extend perpendicularly from the lower face of anti-twist plate 315 and slide into equal number of pinion pockets 318. Anti-Twist plate 315 is covered by top plate 316 which is attached through attachment means through to the exterior end of stanchion 301. Upper portion of stem 70U is shaped to receive an actuator. An actuator can be a manually adjusted handle or wheel or a controlled pneumatic or hydraulic actuator socket as the means to actuate motion in the horizontal plane of ball 13. In the present invention, upper portion 70U is shaped into a square pattern to receive a square key. This arrangement of modular construction of the stem and ball does not permit movement of the ball when subjected to high pressures. Contrary to U.S. Pat. No. 5,494,256 issued to Beson on Feb. 27, 1996 where the ball is free to move the direction of the fluid flow to contact seat. Beson also discloses that the hole holding upper stem is larger than the hole holding the lower allowing for ball movement toward the seals. In the present invention, the seals are floating and the ball is stationery. Both Beson and U.S. Pat. No. 4,026,516 to Matousek issued on May 31, 1977 disclose ball and stem combinations that are integral to each other. Matousek also prefers that the lower bushing by substantially larger than the height of the trunnion. This added friction causes wear issues and also requires a large diameter stem, as shown in Matousek, and torque to overcome the friction component.

It can be seen that maintenance on the wear portions of this valve can be accomplished by either removing the lower stem 62 through stanchion 368 or removing the upper stem 70 through stanchion 301. O-rings can be replaced and stems assembled back into the respective posts within a matter of minutes, rather than having to disassemble the unit to remove an integrated ball and stem assembly. Ball seals are left undisturbed when stem components are in need of maintenance. Prior art requires the resetting of ball seals as the ball and stem are removed together causing a great amount of labor and time to facilitate replacement of simple o-rings on the stems.

Outlet 4 has similar geometries of inlet 2 whereby fluid enters the interior side of outlet 4 through entrance 409. Exit bore 408 increases in diameter as it approaches the exit bore 407 and fluid exits through the exterior opening of 406 into the piping system. As with most plug valves, the orientation of the valve is not critical for it's performance, so the outlet and inlet portions of the valve could be used in opposite functions.

Figure 6:
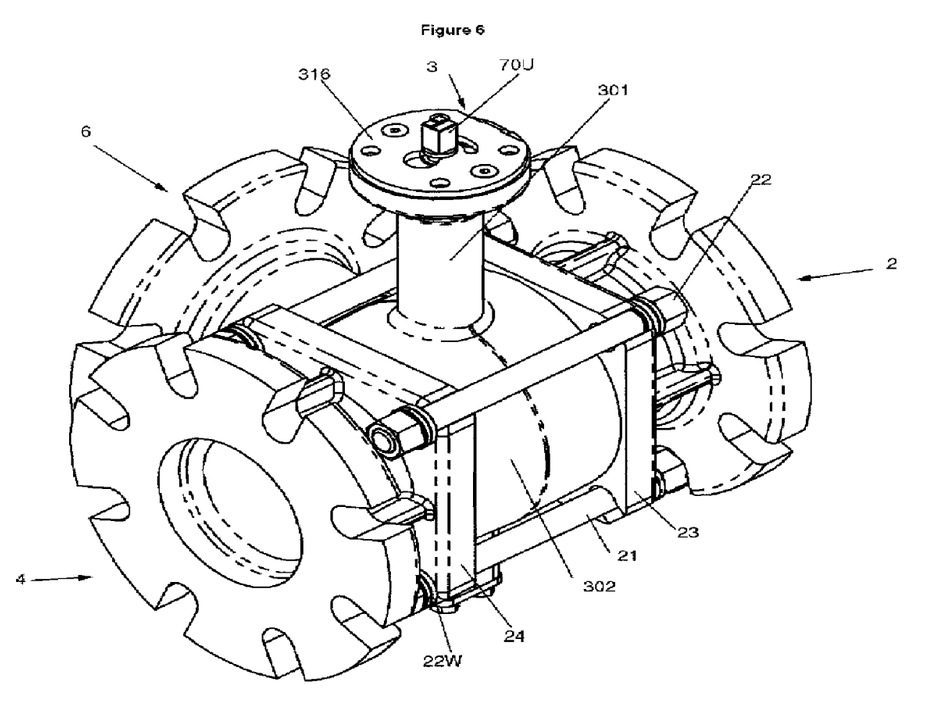
In FIG. 6, the outside view of the 3 port valve is shown.

In the preferred embodiment to this invention, a 3 port valve is disclosed in FIG. 6, where bypass port 6 is added which has an axis perpendicular to the axis of the 2 port valve. With the addition of bypass port 6, ball 13 has three openings and as aforementioned, possesses geometries that allow for the bypass port to receive less fluid flow than the inlet or outlet portions of the valve as seen in FIG. 7. The position of the parabolic opening 51 is same for the mixing ports as the outlet port. It is only the inlet and outlet parabolic opening 51 that are diametrically opposed. It is within the spirit of this invention, to have multiple port valves where there are more than 1 bypass valve associated with an inlet and outlet portions. It is not critical for the bypass ports to be perpendicular and can be at oblique angles to the axis of the inlet and outlet sections. Bypass port 6 is constructed similarly to inlet 2 and outlet 4 in it's geometries and functions whereby there is a groove 618 in which rides linear stroke o-ring 15 and sealing member 14 rides in raceway 616 and the face of the interface between valve body 3 and bypass 6 is surrounded by o-ring 69 secured inside of groove 640. It is possible to extend this concept of sealing member 15 and linear stroke o-ring 15 to multiple port configurations.

This valve has succeeded in achieving the objectives of this invention, and though only current technology exists, future technologies may produce materials and components that would accomplish these objective in different or similar manners. These advances would be considered to be within the spirit, scope and intent of this patent and the claims herein disclosed

What is claimed is:

1. A high differential pressure, low torque precision temperature control valve comprising;
   a fluid chamber;
   a fluid acceptance passageway, at least one fluid bypass passageway and a fluid discharge passageway each having interior and exterior edges;
   a valve body, having upper and lower stanchions, where said interior edge of said fluid acceptance and said interior edge of said fluid discharge passageways are axially disposed and appurtenant to opposite ends of said fluid chamber and said interior edge of said fluid bypass passageway is angularly disposed along the horizontal axis of said fluid chamber, interposed between said interior edge of said fluid acceptance passageway and said interior edge of said fluid discharge passageway, and appurtenant to said fluid chamber;
   an attachment means connected onto said exterior edge of said fluid acceptance said exterior edge of said fluid bypass and said exterior edge of said fluid discharge passageways;
   a plug centrally interposed therein said fluid chamber, spherically shaped, possessing an upper boss and a lower borehole centrally disposed on the parameter of said plug along the vertical axis of said plug, and a set of orifices diametrically opposed, juxtapositionally opposite, along the parameter of said plug along the horizontal axis of said plug and at least one orifice, corresponding to said bypass passageway, angularly aligned along the parameter of said plug along horizontal axis of said plug, where said horizontal axis of said plug is coincident with the horizontal axis of said fluid acceptance, said fluid bypass and said fluid discharge passageways, said upper boss is adapted to receive rotational transpositional means for said plug, said lower borehole adapted to forcibly receive a plate, said plate has externally mounted thereonto a lower stem receiving post;

a two sided raceway circumferentially described onto and near said interior edge of said fluid acceptance, said interior edge of said bypass passageway, and said interior edge of said fluid discharge passageways, said raceway having a depth and a height component;

a circumferential groove circumscribed within said raceway;

a set of non-metallic sealing members, elliptical in profile, disposed within said circumferential grooves;

a set of polymer based seals, polygonal in profile, in sustained contact with said plug, having a radiused face, a lower frontal area, an upper frontal area, a flat bottom less in length than said depth component of said raceway, and an exterior side adapted to receive a portion of said sealing member;

an upper stem, superimposed internally to said upper stanchion having an anterior and a dorsal end, where said anterior end is adapted to frictionally interface with said upper boss of said plug, said upper stem providing rotational transpositional means to change position of said plug along said vertical axis of said plug, said dorsal end of said upper stem is adapted to receive an actuator interface; and a lower stem, superimposed internally, to said lower stanchion, stationaryily mounted to exterior end of said lower stanchion and bearingly mounted into said lower stem receiving post.

2. A high differential pressure, low torque precision temperature control valve as in claim 1 where said raceway has installed thereon a containment ledge containing movement in the plane of decompression of said sealing member, said ledge to be no greater than a distance whereby said sealing member has not less than 10% compression when said seal is in contact with said ledge.

3. A high differential pressure, low torque precision temperature control valve as in claim 2 where said lower frontal area of said seal is adapted to interface with said containment ledge.

4. A high differential pressure, low torque precision temperature control valve as in claim 1 where plane of said sealing member decompression is parallel to horizontal axis of said plug.

5. A high differential pressure, low torque precision temperature control valve as in claim 1 where plane of said sealing member decompression is parallel to vertical axis of said plug.

6. A high differential pressure, low torque precision temperature control valve as in claim 1 where an o-ring is placed along the interface of said valve body to said fluid acceptance passageway, along interface between said valve body and said bypass passageway, and said valve body interface with said fluid discharge passageway to prevent leakage.

7. A high differential pressure, low torque precision temperature control valve as in claim 1 where said radiused face of said seal is coincident with outer radius of said plug.

8. A high differential pressure, low torque precision temperature control valve as in claim 1 where major diameter of said elliptical profile of said sealing member is such as to maintain at least 10% compression whilst said plug is in contact with said seal.

9. A high differential pressure, low torque precision temperature control valve as in claim 1 where said upper stem and said lower stem are adapted to receive o-rings to prevent leakage.

10. A high differential pressure, low torque precision temperature control valve as in claim 1 where said orifices are two parabolically shaped curves symmetrical about their directrix, apex of said curves are mathematically derived from and proportionally related to flow requirements of valve, said apexes joined by radiused segment.

* * * * *